(12) United States Patent
Du Plessis et al.

(10) Patent No.: US 9,085,812 B2
(45) Date of Patent: Jul. 21, 2015

(54) SULFIDE ORE LEACHING PROCESS

(71) Applicant: VALE S/A, Rio de Janeiro-RJ (BR)

(72) Inventors: Chris Andre Du Plessis, West Perth (AU); Nelson Eduardo Mora-Huertas, West Perth (AU); Felipe Hilario Guimaraes, West Perth (AU); Keith Graham Bowes, West Perth (AU)

(73) Assignee: VALE S.A., Rio de Janeiro (BR)

( * ) Notice: Subject to any disclaimer, the term of this patent is extended or adjusted under 35 U.S.C. 154(b) by 1 day.

(21) Appl. No.: 13/886,989

(22) Filed: May 3, 2013

(65) Prior Publication Data

US 2013/0291686 A1  Nov. 7, 2013

Related U.S. Application Data

(60) Provisional application No. 61/643,042, filed on May 4, 2012.

(51) Int. Cl.
 *C22B 15/00* (2006.01)
 *C22B 3/06* (2006.01)

(52) U.S. Cl.
 CPC ............... *C22B 15/0065* (2013.01); *C22B 3/06* (2013.01); *C22B 15/0067* (2013.01)

(58) Field of Classification Search
 CPC .... C22B 15/0065; C22B 15/0067; C22B 3/06
 USPC .......................................................... 75/743
 See application file for complete search history.

(56) References Cited

U.S. PATENT DOCUMENTS

| | | | |
|---|---|---|---|
| 6,277,341 B1* | 8/2001 | Pinches et al. | 423/27 |
| 6,319,389 B1* | 11/2001 | Fountain et al. | 205/583 |
| 2005/0022629 A1* | 2/2005 | Ando et al. | 75/419 |
| 2008/0241024 A1* | 10/2008 | Riekkola-Vanhanen et al. | 423/27 |

FOREIGN PATENT DOCUMENTS

| WO | WO 2005118894 A1 * | 12/2005 | C22B 15/00 |
|---|---|---|---|
| WO | WO 2008138038 A  * | 11/2008 | |

* cited by examiner

*Primary Examiner* — George Wyszomierski
*Assistant Examiner* — Tima M McGuthry Banks
(74) *Attorney, Agent, or Firm* — Arent Fox LLP

(57) ABSTRACT

The present invention discloses a new process for leaching sulfide minerals consisting of leaching crushed ore in a vat reactor, wherein the leaching solution is fed with an ORP value close to the upper limit suitable for leaching and the exiting leaching solution leaves the reactor with an ORP above the lower limit suitable for leaching the ore. The output leaching solution that leaves the leaching reactor goes through an iron oxidation stage outside the leaching reactor, with the iron oxidation producing soluble ferric sulfate that is mixed with a recirculated portion of the output leaching solution to increase its ORP up to a value close to the upper limit of the redox potential range that is suitable for the ore leaching.

11 Claims, 5 Drawing Sheets

SULFIDE ORE LEACHING PROCESS

This application claims priority from U.S. Patent Application No. 61/643,042, titled "Sulfide Ore Leaching Process," filed on May 4, 2012, and which is incorporated herein by reference in its entirety.

FIELD OF INVENTION

This present invention refers to a process for leaching sulfide ores and, particularly, to a process for leaching chalcopyrite ore for recovering copper.

DESCRIPTION OF THE RELATED ART

Leaching of low grade sulfide ores has been challenging, particularly from primary sulfides. While secondary sulfides (for example, chalcocite) are amenable to leaching (similarly to oxide ores), primary sulfides (for example chalcopyrite) are relatively refractory. In sulfate systems, secondary sulfides require, in addition to acid, an oxidant for leaching, which is usually in the form of ferric iron. However, the presence of ferric iron and acid is not sufficient to achieve effective leaching of primary sulfide ores, such as chalcopyrite. Usually, chalcopyrite leaching requires either:

high oxidation-reduction potential (ORP) (>500 mV versus Ag/AgCl 3M KCl) and high temperature (that is, above 60° C.), or low ORP controlled within an ORP leaching window (usually 380 to 450 mV) at ambient temperature (20 to 35° C.).

Control of the ORP when operating at low temperatures is particularly important to avoid passivation of the chalcopyrite (Third et al., 2002; van der Merwe et al., 1998; Hiroyoshi et al., 2001) as this effect is irreversible. Control of the amount of ferrous ions in solution (where the ratio of ferrous to ferric iron is the main controlling factor of the ORP) has been known to improve copper leaching extraction from chalcopyrite ore and concentrate (Hiroshi et al., 1997) and previous reports relating to high ORP control by either microbiological means (Muñoz et al. 1995, Ahonem et al. 1985, Muñoz et al. 1995) or electrochemical methods (Gomez et al. 1996, Wan et al. 1984) have also been documented.

The above are well-known to those skilled in the art and has been used in the leaching of concentrates using tank-type reactors under atmospheric conditions, usually with fine grind size (Hourn et al. 1995), or taking advantage of the galvanic effect of pyrite to improve the chalcopyrite leaching extent (Dixon et al. 2005) or under high temperature and pressure (Dempsey et al. 1999) where the ORP window of operation is widened.

ORP controlled leaching of concentrate has also been reported in agitated tank reactors under atmospheric conditions where bacterial oxidation is used to control the ferric to ferrous ratio (and thereby the ORP) either within the reaction vessel or in a separate vessel (van der Merwe et al. 1998).

Although the above mentioned processes achieve the leaching of chalcopyrite, the operating cost of these agitated tank leaching reactors is very high, making it prohibitive for the treatment of low grade ores and, additionally, it would be necessary to use a much smaller size of particles than the particles used in heap leaching. The need for smaller particles, in turn, would increase grinding costs. Thus, the process would become unsustainable for low grade minerals and thus is mainly used for concentrates.

The ORP controlled leaching principle has also been attempted in heaps (Mintek). Heap leaching could be considered the most viable alternative for treating low grade copper ores because it allows the treatment of coarser material avoiding the costs associated with milling Chalcopyrite heap leaching has not found commercial application due to the difficulty in achieving and maintaining the right conditions for chalcopyrite leaching (temperature and ORP control) in a heap system, which are:

High temperature conditions require sulfur mineral sources or external heating. It is known that the combination of high temperature and high ORP results in effective chalcopyrite heap leaching. These high ORP conditions (>500 mV) are readily achieved in aerated heaps, where iron oxidation occurs by bacteria residing in the heaps, and does not require dedicated control mechanisms. The high temperature required for effective chalcopyrite leaching, requires the presence of sufficient sulfides (usually, more than 3% of sulfur content relative to the ore mass) and sufficiently rapid sulfide oxidation (which may require supplementation of carbon dioxide, to the aeration system, as a carbon source in order to achieve sufficient microbial cell concentrations for sulfur oxidation). The oxidation of sulfur or sulfide minerals, results in the release of heat that can raise the leaching temperature, if properly controlled. However, in lower grade ore, the sulfide content is often insufficient to generate the required heat for chalcopyrite heap leaching.

External heating is typically expensive. One of the options for recovering chalcopyrite from heap leaching is to heat the leaching solution externally using an artificial source of heating, instead of relying on heating by oxidation of sulfides in the ore. However, the extent of heat losses from heaps, combined with the extended leaching time periods, generally make external heating uneconomical. This is true especially in the case of low temperature climatic locations.

High ORP leaching at ambient temperature causes passivation: although high ORP levels (i.e. complete oxidation of all soluble iron) are readily achievable in heaps at ambient temperatures (20-35° C.), high ORP at such temperatures cause passivation effects on the surfaces of chalcopyrite minerals, preventing the copper from being effectively leached.

In heap leaching, it is difficult to keep the ORP within a low potential range: to keep the percolation solution ORP in a heap within a narrow low reduction potential window (380 to 450 mV, i.e. where the a portion, rather than all, of the iron is oxidized) required for leaching chalcopyrite at ambient temperatures (20 to 45° C.) is difficult for several reasons:

The first point is the inaccurate control of the oxygen mass transfer, resulting from the bottom aeration of heaps and in the gradient effects it generates;

A second point is related to the fact that ferric iron (or any other oxidant) percolates in the heap in a plug flow mode (hydraulic conductivity in heaps occurs in a thin film of solution percolating on the surface of some ore particles), being consumed rapidly by the oxidation of sulfides, causing ORP gradients in the heap (that is, high ORP at the top and low potential at the bottom);

The third point refers to the fact that aeration as a means to induce bacterial oxidation of ferric iron inside heaps does not provide the level of control required to keep ORP within a narrow range.

In addition to the aforementioned sulfate leaching systems, leaching of chalcopyrite in chloride systems have also been reported (Jones, 2002, Streltsova, 2006). Although chloride is known to assist chalcopyrite leaching, the use of chloride causes a number of process problems and disadvantages:

The elimination of chloride solutions in the processing downstream is problematic due to the high solubility of chloride; and-Chloride in solution results in higher corrosion of plant equipment.

Faced with the aforementioned problems, the present invention provides a leaching process to recover copper from sulfide ores where the physical-chemical characteristics of the lixiviant (temperature, ORP, pH, additives) are tightly control within an operating window resulting in a leaching kinetics that is more efficient and cost-effective than the known in the art.

This invention also aims at providing a leaching process to be used in un-milled material so the order of magnitude of the feed size is similar to that of heap leaching.

The present invention also provides a leaching process showing leaching rates higher than those achieved in heap leaching conditions, at the same time being a process that does not depend on the sulfide oxidation within the ore as a source of heating.

SUMMARY OF THE INVENTION

In light of the above described problems and unmet needs, the present invention describes an advantageous and effective controlled ORP leaching process for sulfide ores that is more efficient and cost-effective than the known in the art, the said process comprising:

crushed ore leaching in a vat reactor into which an input leaching solution is fed with a solution containing an ORP (governed by the ratio ferric to ferrous iron) close to the upper limit of an optimal ORP range adequate for ore leaching, where ferric iron acts as the oxidant during the leaching reaction with chalcopyrite (Equation 1, Table 1) and is reduced to ferrous iron in the process (as per the equation below), and from where the output leaching solution leaves with an ORP above the lower limit of the ORP range suitable for leaching the ore in question;

where a portion of the output leaching solution leaving the leaching reactor passes through an iron oxidation stage (Equation 2, Table 1) (du Plessis et al. 2011) in a medium outside the leaching reactor, the iron oxidation producing soluble ferric sulfate that is mixed with a recirculated portion of the output leaching solution to increase its ORP to a value close to the upper limit of the ORP range suitable for leaching the ore.

In a preferred embodiment of this invention, the crushed ore has particles ranging from 2 mm to 120 mm and the ore inside the leaching reactor is substantially submerged in the leaching solution, so that voids between crushed ore particles are saturated and filled in with the leaching solution.

Still on the preferred embodiment, chalcopyrite is the sulfide mineral present in the ore, the leaching solution has an ORP at upper boundary of the leaching window illustrated in FIG. 1, and the solution contact time with ore is managed, through the hydraulic retention time relative to the solids retention time, so that the solution ORP remains within the optimal leaching window indicated in FIG. 1 (i.e. ~380 to 450 mV at temperatures of 25-45° C. or >500 mV at temperatures >60° C.

In another embodiment of the invention, iron oxidation through bio oxidation (du Plessis et al. 2011) allows for precipitation of jarosite (Equation 3, in Table 1) and thereby removal of a portion of iron from solution, and the co-precipitation and removal of impurities (for example arsenic, aluminum, chromium, fluorine, and uranium) from the leaching solution. Jarosite precipitation, in turn provides acid to facilitate ferrous iron oxidation. The iron oxidation reaction can be supplemented with sulfur or pyrite to provide additional acid (Equations 4 and 5, Table 1). Importantly, the combined effect of iron oxidation with acid generation, from either jarosite sulfur or pyrite, generates heat (Equations 6-8). The relative proportions of the three reactions (Equations 6-8) is controlled by the addition of sulfur or pyrite and is optimized to achieved the optimal desired iron and heat balance in the leach circuit, as outlined in FIG. 1. Sulfuric acid from an acid plant may also be directly added to the reactor to facilitate the acid-consuming iron oxidation reaction.

When the metal (e.g. copper) concentration of the leaching solution achieves a value suitable for recovery, a bleed is removed from the solution circuit and subjected to the treatment for recovering the metal in question.

Additional advantages and novel features of these aspects of the invention will be set forth in part in the description that follows, and in part will become more apparent to those skilled in the art upon examination of the following or upon learning by practice of the invention.

BRIEF DESCRIPTION OF THE DRAWINGS

Various example aspects of the systems and methods will be described in detail, with reference to the following Figures but not limited to, wherein.

DETAILED DESCRIPTION OF THE INVENTION

The following detailed description does not intend to, in any way, limit the scope, applicability or configuration of the invention. More exactly, the following description provides the necessary understanding for implementing the exemplary modalities. When using the teachings provided herein, those skilled in the art will recognize suitable alternatives that can be used, without extrapolating the scope of the present invention.

Figure 2:
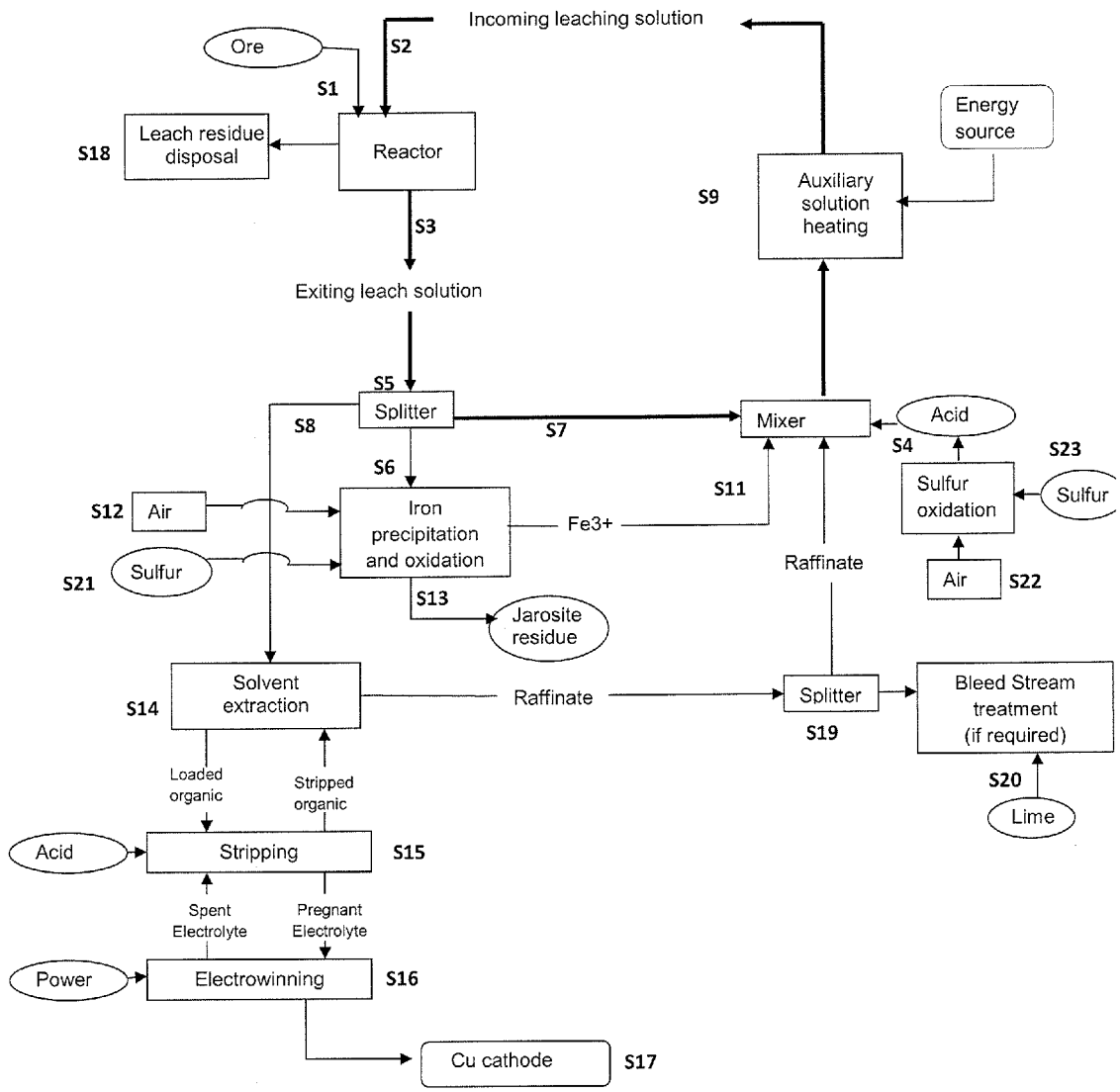
FIG. 2 is a flowchart of a preferred embodiment of the leaching process according to this invention.

FIG. 2 is a flowchart showing the main stages of execution of a preferred embodiment of the process of this invention.

Although FIG. 2 depicts a leaching process aimed at recovering copper from chalcopyrite ore, it must be understood that this present invention process can be applied to any other sulfide mineral ore or concentrate.

At the start of the process, the ore is fed into a leaching reactor (indication S1 in the flowchart). The ore is preferably fed crushed, with particle sizes ranging from 2 mm to 120 mm.

The choice of particle size is preferably determined by prior investigation where the mineral liberation is determined as a function of crush size (i.e. particle size). The extent of mineral liberation (i.e. exposure to the leach solution), in turn, governs the maximum amount of metal that can be leached.

The use of crushing resulting in coarse particles (>1 mm), rather than milling (<1 mm), results in lower comminution costs.

In an embodiment of the invention, the ore can be fed and recovered from the leaching reactor on a continuous basis. Alternatively, the reactor can be operated in batch mode, in which case the ore remains in the reactor for as long as it is required to achieve the desired metal extraction.

Figure 3:
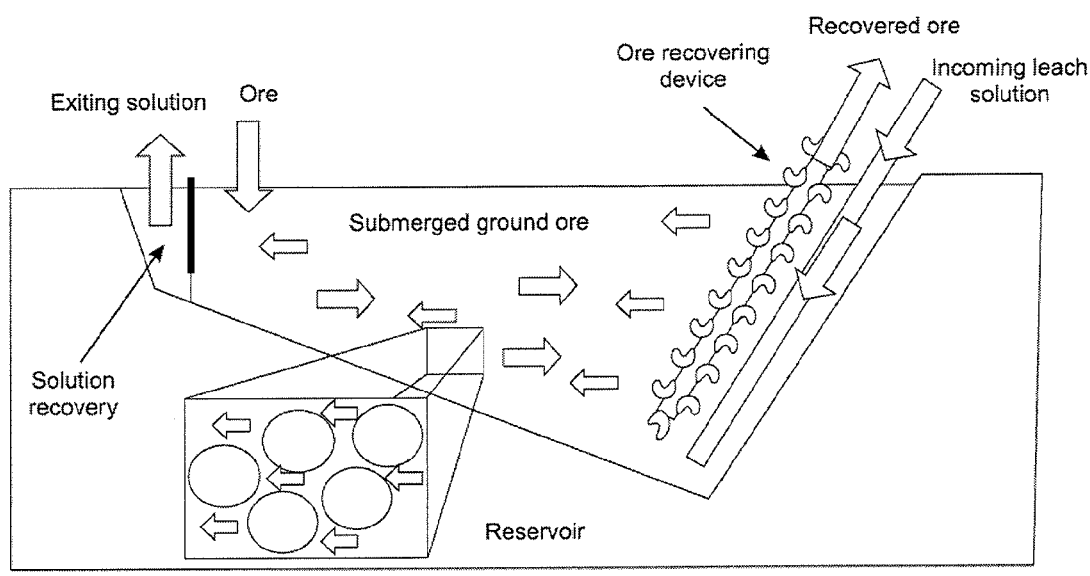
FIG. 3 is a schematic representation of a leaching reactor used in the preferred embodiment of the leaching process of this invention.

FIG. 3 illustrates a preferred embodiment of the leaching reactor used in the present invention. As it can be seen in this Fig., the crushed ore is kept submerged in a leaching solution inside a constructed reservoir or vessel at ambient pressure conditions.

Intra-particle voids are saturated and filled with the leaching solution, thereby ensuring maximum hydraulic conductivity.

The said leaching solution consists of a ferric and ferrous sulfate solution at a pH between 0.5 and 2.5 and an ORP suitable to the temperature conditions (ie. 380 to 450 mV at temperatures of 25-45° C. or >500 mV at temperatures >60° C.), Said leaching solution may also contain solid additives such as carbon, magnetite or liquid additives such as polar organic solvents. Said solution may also contain an active biomass of ferroxidant bacteria or archea and a cell density >$1 \times 10^4$ cells/ml and preferably >$1 \times 10^6$ cell/ml.

In the preferred embodiment, which uses the semi-continuous vat leaching reactor, the ore flows by gravity from the ore feed at the top of the vat to the ore recovery point, without being agitated during this process. The ore is recovered independently in relation to the physical properties of the ore (that is to say, in the case of the ore being a crushed material or fine powder). To that end, an ore recovering system can be used, such as gravity discharge into a conveyor, a mechanical reclaiming device or slurry pump.

The leaching solution is fed into the reactor (indication S2 in the flowchart) with an ORP close to the upper limit of the optimal ORP leaching window suitable to leaching the ore of interest while the solution leaves the reactor (indication S3 in the flowchart) with an ORP above the lower limit of the ORP leaching window. So, in the case of chalcopyrite containing ore, the leaching solution is fed within the range of 380-450 my, and preferably leaves the reactor before the ORP reaches the lower limit of, for instance, 380 mV at temperatures 25-45° C. The equivalent feed and preferred exit solution ORP is 500 and 700 mV at temperatures above 60° C.

Figure 1:
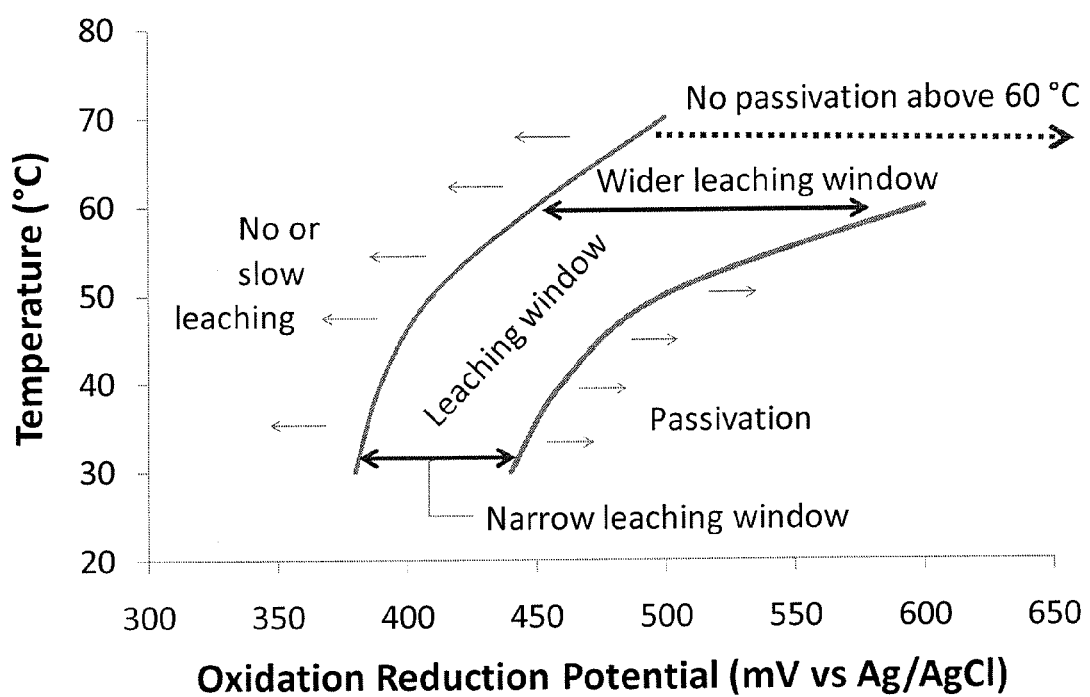
FIG. 1 is a graph illustrating the optimal solution ORP for the leaching of copper from chalcopyrite as a function of temperature.

Optimal leaching is achieved by maintaining the ORP of the leaching solution within the boundaries as illustrated in FIG. 1. This is achieved by a high solution flux through the ore, which is in turn achieved because of the high hydraulic flow rates through the ore within the vat leaching scenario described where all voids participate in solution flow.

That way, the leaching solution residence time is kept under control in such a way that the solution leaves the leaching reactor before the ORP of the solution drops below the lower ORP limit, in order to ensure effective leaching (in the case of chalcopyrite, around 380 mV at temperatures of 25-45° C. or 500 mV at temperatures above 60° C.

In addition to the chemical leaching effect of ferric iron, microbes (i.e. bacteria and archaea) are known to accelerate and catalyze the leaching effect of chalcopyrite (Li and Huang, 2011; Gautier et al. 2008). The accelerated leaching effect is dependent upon a high cell concentration in the leaching reactor.

The leaching flow sheet illustrated in FIG. 2 is designed to enhance the cell concentration of suitable bioleaching microbes. A key feature of the invention relies on the use of self-multiplying bioleaching catalysts. This is achieved through the integration of the iron oxidation process unit, with the leaching vat reactor. High cell concentrations (preferably >$10^9$ cells per mL) are achieved in the iron oxidation and precipitation reactor by methods known in the art (du Plessis et al. 2011).

The high cell concentrations are brought into contact with the chalcopyrite minerals by the recirculating solution.

The cell concentration and diversity is further enhanced by the addition of sulfur or pyrite (S21) to the iron oxidation reactor, as is known in the art. Such additions facilitate the proliferation of sulfur oxidizing microbial cultures, in addition to iron oxidizing cultures where they accelerate the oxidation of reduced sulfur species thereby preventing them from causing chalcopyrite passivation.

In alternative embodiments for the present invention, the leaching solution can also contain other known elements aimed at accelerating the chalcopyrite leaching, including Chloride, silver, activated carbon, or nano-silica can also be included in the leaching solution or else be present as a result of being leached from the ore. These additives can be recovered from the leach solution exiting the vats (indicated by S5 in FIG. 2) and returned to the leach (indicated by S7 in FIG. 2). However, the presence of these elements shall not be understood as a needed requirement.

Inside the leaching reactor, the ferric iron in the solution reacts with copper sulfide minerals, resulting in the mineral dissolution (Equation 1, Table 1), as is known by those skilled in the art.

Therefore, in the preferred embodiment of the invention where the ore to be leached is chalcopyrite, the ORP control (based on the ferrous/ferric ratio) within a range in which the chalcopyrite is not significantly passivated allows for an effective copper recovery from this sulfide mineral.

Figure 4:
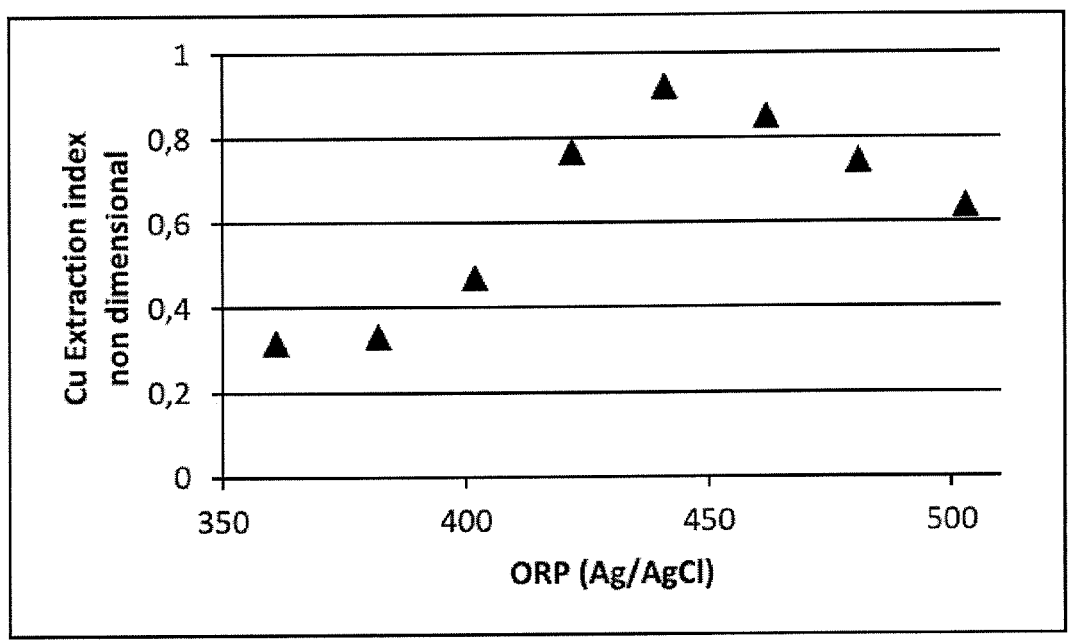
FIG. 4 illustrates exemplary results using a set of different ORP leaching conditions at, pH 1.5 and 45° C.
Figure 5:
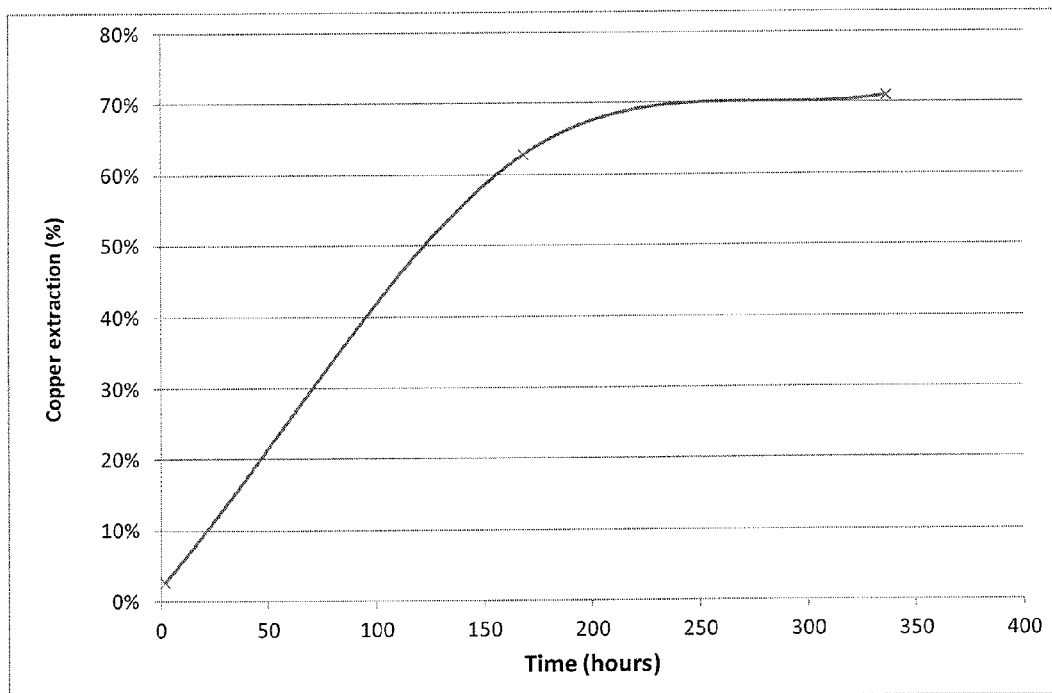
FIG. 5 illustrates exemplary results of chalcopyrite leaching at an ORP of 650 mV, pH 1.5 and 70° C.

FIG. 4 illustrates the effect of various oxidation reduction potentials on the relative extent of copper extraction at pH 1.5 and 45° C. This graph illustrates the importance of maintaining the solution composition within a narrow ORP window at 45° C. in order to achieve optimal copper extraction. Important to note is that irreversible chalcopyrite passivation occurs at an ORP above 450 mV at this temperature.

Preferably, the pH of the input leaching solution is adjusted by adding sulfuric acid (indicated by S4) so as to reach a pre-determined pH in the output solution, preferably between 0.8 and 2.0. This acid can be produced in a conventional acid plant or in a microbial sulfur oxidation reactor, both of which are known in the art and consume both air (S23) and sulfur (S23). Heat generated from such sulfur oxidation and acid generation, may be utilized to increase the circulating solution temperature.

The residence time of the solution in the leaching reactor is shorter than the residence time of the ore. The solution flow rate through the ore should ensure that the acid and ORP gradients will be overcome to allow for enough control of the process within the desired ranges of pH and ORP, this being the primary control parameter.

The solution flow can be ascending, from a distribution pipe or manifold at the lower portion of the reactor as shown in FIG. 3, ensuring that air is expelled from voids between particles and filled with solution.

In an embodiment of the present invention, the leaching can be accomplished in multiple phases, on a counter-current basis.

As shown in the FIG. 2 flowchart, based on a preferred embodiment of the present invention, the output leaching solution flow is divided (indicated by S5), with the first portion being directed to an iron oxidation and precipitation unit (indicated by S6) and the second portion, containing soluble ferric iron, being recirculated (indicated by S7). The rich PLS leaching solution is then subjected to a typical downstream copper recovery circuit i.e. solvent extraction—electrowinning (indicated by S8).

The flow portion that is directed to iron oxidation is determined by the ratio and total concentration of ferrous and ferric iron in the output leaching solution (S3), and also by the required ORP of the input leaching solution (S2).

In the process of the present invention, the iron oxidation is accomplished externally in relation to the leaching reactor. With the iron oxidation being accomplished externally in relation to the reactor, it is possible to use this process to control the leaching solution ORP to the upper set-point (value close to the upper limit) selected from the leaching ORP range that will be used in the leaching reactor.

Iron oxidation can be accomplished through any suitable means such as a specific reactor. The biocatalyzed ferrous oxidation (through bacteria or archea), as is known by those skilled in the art, is a preferred iron oxidation method as it needs only air and also because the rate is faster than what is accomplished through abiotic ferrous oxidation under predominating low pH (that is, pH<2).

An additional benefit is that iron precipitation as jarosite results in the co-precipitation of a number of elements whose removal from the leaching solution can be desirable, including arsenic, aluminum, chromium and fluoride.

The soluble ferric sulfate, as a result of the iron oxidation process (S6) is combined with the input leaching solution (S3) in a mixture chamber (S11) aimed at reaching the desired ORP in the input leaching solution (S2). The combined control of the total iron concentration, ORP, and the hydraulic flow rate (and time of residence in the leaching reactor) of the leaching solution (S2), allows for the control of the ORP inside the leaching reactor, even within a narrow leaching range for the chalcopyrite.

The recirculation solution (S7) can be heated by any suitable heating source (S9) (for example, solar heating, heat from sulfuric acid production, sulfur oxidation, pyrite oxidation, or other energy sources as is known in the art). Heat loss can be minimized through the leaching circuit and other individual operations within the flowchart. Therefore, whenever possible, processes known to those skilled in the art shall also be used to minimize heat loss.

Because the ore is kept submerged in the leaching reactor, it facilitates heat retention. The use of high leaching temperatures (above 60° C.), results in improved leaching kinetics and smaller leaching reactor. Smaller reactors, in turn, result in lower reactor cost. Additionally, a smaller leaching reactor reduces the required energy for heating. The economical trade-off between heating energy and increased leaching rates needs to be determined for each specific application scenario. Temperatures above 60° C. also allow for high ORP leaching solutions, above 500 mV, to be used to improve copper leaching kinetics without substantially causing chalcopyrite passivation.

The rich leaching solution (S8) is subjected to solvent extraction (S14) and electrowinning in a way that is known by those skilled in the art. Copper is removed (S15) from the loaded organic solution using spent acid electrolyte and complementary acid, resulting in copper-rich electrolyte that is then taken for electrowinning (S16), where copper cathode is produced (S17).

The vat leaching process facilitates the use of agents to overcome the passivation effect of chalcopyrite under leaching such as the use of silver, activated carbon, bacteria, archaea, and nano-silica (the use of agents such to overcome the passivation of chalcopyrite is known in the art and will not be further detailed herein). The high hydraulic flux of solution through the ore, and the fact that all voids are filled with solution, allows for the recovery and re-use of such agents (or catalysts).

In an alternative embodiments of the present invention, the process can comprise metal sulphide precipitation (for instance, by precipitating copper as CuS using hydrogen sulphide) instead of solvent- and reduction-based methods that produce copper cathode.

Depending on the ore's consumption of acid and on the amount of soluble elements disposed of together with leach residue (S18), there's the likelihood that part of the raffinate will have to be separated (S19) and subjected to neutralization and precipitation treatment (S20) aimed at the removal of typical impurities such as magnesium and aluminum sulfates (if required).

So, this present invention process allows for the control of the solution conditions in order to secure copper leaching from chalcopyrite ore, with no milling. This method can further allow for the control of the ORP and higher temperatures, thereby facilitating copper recovery from low grade chalcopyrite ore.

The invention also allows for operation at elevated temperature (>60° C.) and with a high ORP >500 mV in order to achieve effective chalcopyrite leaching.

To this effect, the process of the present invention can also be used for leaching secondary sulphide ores (e.g. chalcocite), to which a high ORP leach condition (>500 mV) can be applied even at ambient temperatures.

In the case of the latter, a first leaching step can be conducted under an ORP control regime that suits chalcopyrite, and then moved into a different ORP control that suits chalcocite or covelite.

The process of the present invention can further be used for the extraction of other metals, including nickel, cobalt, manganese, gold, and uranium.

Based on the exemplified description hereinabove, it becomes clear that the process of the present invention makes for the control of the leaching solution conditions in order to accomplish copper leaching from chalcopyrite contained in crushed ore, without milling being required. So, this present invention process comprises a leaching reactor in which the ore is submerged and the ORP is kept under control within the ideal range for chalcopyrite leaching, with the solution entering the reactor being controlled by the ideal range upper limit. The reactor's design allows a fast moving hydraulic flow through the ore to facilitate high rate delivery of the required ferric iron oxidant required for leaching. The high hydraulic flow rate through the ore allows for the leach solution to leave the leaching reactor before the solution potential reaches a value that is below the ideal range lower limit of the leaching ORP for chalcopyrite. Additionally, the reactor's design and the process configuration are intended to reduce heat loss and prevent oxygen from entering. The iron oxidation is then initiated externally in relation to the leaching reactor, thereby increasing the recirculating leaching solution ORP back to the value close to the ideal range upper limit of the ORP. Sulfur or sulfide containing minerals such as pyrite, are directly added to the iron oxidation step in order to generate both heat and acid to the leach solution. Reduced iron and sulfur are oxidized by the biocatalytic properties of microbes. These microbes, which may be either bacteria or archaea, are utilized and managed as self-multiplying biocatalysts to enhance the rate of chalcopyrite leaching.

Finally, it should be understood that the FIGS. show exemplificative embodiments of the present invention, with the real scope of the invention object being defined only in the enclosed claims.

TABLE 01

| o. Reaction | G* J | H* J | ΔH* kJ/mole O2 |
|---|---|---|---|
| Ferric Consuming Chalcopyrite Leaching Reaction | | | |
| $CuFeS_2 + 4Fe^{3+} \rightarrow Cu^{2+} + 5Fe^{2+} + 2S^0$ | 144 | 6 | |
| Acid Consuming Ferrous Oxidation Reaction | | | |
| $Fe^{2+} + H^+ + 0.25 O_2 \rightarrow Fe^{3+} + 0.5 H_2O$ | 40 | 101 | 402 |
| Acid Generation Reactions | | | |
| $K^+ + 3Fe^{3+} + 2SO_4^{2-} + 6H_2O \rightarrow KFe_3(SO_4)_2(OH)_6 + 6H^+$ | | 36 | |
| $S^0 + 1.5 O_2 + H_2O \rightarrow SO_4^{2-} + 2H^+$ | 497 | 633 | 422 |
| $FeS_2 + 3.75O_2 + 0.5H_2O \rightarrow Fe^{3+} + 2SO_4^{2-} + H^+$ | 1192 | 1566 | 418 |
| Acid-Neutral Combined Iron Oxidation and Acid Generation Reactions | | | |
| $6Fe^{2+} + 1.5O_2 + K^+ + 2SO_4^{2-} + 3H_2O \rightarrow KFe_3(SO_4)_2(OH)_6 + 3Fe^{3+}$ | 231 | 366 | 245 |
| $2Fe^{2+} + S^0 + 2O_2 \rightarrow 2Fe^{3+} + SO_4^{2-}$ | 576 | 834 | 417 |
| $Fe^{2+} + FeS_2 + 4O_2 \rightarrow 2Fe^{3+} + 2SO_4^{2-}$ | 1232 | 1667 | 417 |

*Thermodynamic parameters at 50° C.

REFERENCES

Ahonem L., P. Hiltunen and O. H. Touvinen. The role of pyrrhotite and pyrite in the bacterial leaching of chalcopyrite ores. Fundamentals and applied biohydrometallurgy. Proceedings of The Sicth International symposium on Biohydrometallurgy, Vancouver BC, Canada, Aug. 21-24, 1985. Edited by R. W. Lawrence, R. M. R. Branion and H. G. Ebner. 1985

Dempsey P. and D. B. Dreisinger. Process for the extraction of copper. World Patent WO 0100890 (A1). 1999

Dixon D. G and A. F. Tshilombo. Leaching process for copper concentrates. United States Patent US20052699208 (A1). 2005

Gomez C., M. Figueroa, J. Muñoz, M. L. Blazquez and A. Ballester. Electrochemistry of chalcopyrite. Hydrometallurgy, vol 43, 331-344. 1996

Hiroyoshi N., H. Miki, T. Hirajima and M. Tsunekawa. Enhancement of chalcopyrite leaching by ferrous ions in acidic ferric sulfate solutions. Hydrometallurgy 60, 185-197. 2001 Hourn, M. M., W. D. Turner, I. R. Holzberger. Atmospheric mineral leaching process. Australian Patent AU-B-49331/96. 1995

Jones, D. Chloride assisted hydrometallurgical extraction of metal. United States Patent US 20020004023A1. 2002

Muñoz J. A., A. Ballester, M. I. Blazquez, F. Gonzalez and C. Gomez. Studies on the anodic dissolution of chalcopyrite at contant potential: effect of a new thermofilic microorganism. Proceedings of COPPER 95-COBRE 95 International conference. Vol III—Electrorefining and Hydrometallurgy of Copper. Edited by W. C. Cooper, D. B. Dreisinger, J. E. Dutrizac, H. Hein and G. U Ugarte. The metallurgical society of CIM. 1995

Muñoz J., C Gomez., M. Figueroa, A. Ballester, and M. L. Blazquez. Effect of thermophilic microorganisms on the electrochemical behaviour of chalcopyrite. Biohydrometallurgical processing. Edited by T. Vargas, C. A. Jerez, J. V. Wiertz and H. Toledo. University of Chile. 1995

Streltsova, N and G. D. Johnson. Method for the processing of copper minerals. Australian Patent AU 2006201600 A1. 2006.

Third K. A., R. Cord-Ruwisch and H. R. Watling. Control of the redox potential by oxygen limitation improves bacterial leaching of chalcopyrite. Biotechnol. Bioeng. 78, 433-441. 2002 van der Merwe C., A. Pinches and P. J. Myburgh. A Process for the Leaching of Chalcopyrite. World Patent No. WO 9839491. 1998

Wan R. Y., J. D. Miller, J. Foley and S. Pons. Electrochemical features of the ferric sulphate leaching of $CuFeS_2/C$ aggregates. Proceedings of the international symposium on electrochemistry in mineral and metal processing. Edited by P. E. Richardson, R. Woods and S. Srinivasan. 1984 du Plessis C. A., Slabbert W., Hallberg K. B., Johnson D. B. Ferredox: A biohydrometallurgical processing concept for limonitic nickel laterites. Hydrometallurgy 109, 221-229. 2011

Li. A. Huang, S. 2011. Comparison of the electrochemical mechanism of chalcopyrite dissolution in the absence or presence of Sulfolobus metallicus at 70° C. Minerals Engineering 24, 1520-1522.

Gautier, V., Escobar, B., Vargas, T. 2008. Cooperative action of attached and planktonic cells during bioleaching of chalcopyrite with Sulfolobus metallicus at 70° C. Hydrometallurgy 94, 1-4, 121-126.

The invention claimed is:

1. A process for leaching sulfide minerals, comprising:
crushed ore leaching in a vat reactor in which an input leaching solution is fed with an oxidation-reduction-potential ("ORP") close to an upper limit of an ORP range suitable for ore leaching and from where an exiting leaching solution leaves with an ORP above a lower limit of the ORP range and less than the ORP of the input leaching solution, wherein the ORP range is about 380 to 450 mV at a temperature of 25 to 45° C. or 500 to 700 mV at a temperature of greater than 60° C.; and
where part of the exiting leaching solution that leaves the vat reactor goes through an iron oxidation stage, external to the vat reactor, with the iron oxidation producing soluble ferric sulfate that is mixed with a recirculated portion of the output leaching solution to increase its ORP up to a value close to the upper limit of the redox potential range that is suitable for the ore leaching.

2. The process according to claim 1, wherein the crushed ore has particle sizes ranging from 2 mm to 120 mm.

3. The process according to claim 1, wherein ore inside the vat reactor is kept substantially submerged in the leaching solution in a way that voids between the ore crushed particles are saturated and filled in with the leaching solution.

4. The process according to claim 1, wherein iron oxidation reaction is supplemented with sulfur or pyrite to provide additional acid in order to generate heat, the additional sulfur or pyrite being controlled to achieve a desired iron and heat balance.

5. The process according to claim 1, wherein the iron oxidation allows for precipitation of jarosite, and co-precipitation of leaching solution impurities.

6. The process according to claim 1, wherein when an ore of interest has enough concentration for recovery, an enriched leaching solution is removed from the process and subjected to treatment for recovery of the ore of interest.

7. The process according to claim 6, wherein a sulfide mineral present in the ore is a primary sulfide or a secondary sulfide.

8. The process according to claim 7, wherein the primary sulfide is chalcopyrite.

9. The process according to claim 8, wherein the secondary sulfide is chalcocite.

10. A process for leaching sulfide minerals, comprising:
crushed ore leaching in a vat reactor in which an input leaching solution is fed with an oxidation-reduction-potential ("ORP") close to an upper limit of an ORP range suitable for ore leaching and from where an exiting leaching solution leaves with an ORP above a lower limit of the ORP range, wherein the ORP range is about 380 to 450 mV at a temperature of 25 to 45° C. or 500 to 700 mV at a temperature of greater than 60° C., wherein the crushed ore has particle sizes ranging from 2 mm to 120 mm; and
where part of the exiting leaching solution that leaves the vat reactor goes through an iron oxidation stage, external to the vat reactor, with the iron oxidation producing soluble ferric sulfate that is mixed with a recirculated portion of the output leaching solution to increase its ORP up to a value close to the upper limit of the redox potential range that is suitable for the ore leaching.

11. A process for leaching sulfide minerals, comprising:
crushed ore leaching in a vat reactor in which an input leaching solution is fed with an oxidation-reduction-potential ("ORP") close to an upper limit of an ORP range suitable for ore leaching and from where an exiting leaching solution leaves with an ORP above a lower limit of the ORP range, wherein the ORP range is about 380 to 450 mV at a temperature of 25 to 45° C. or 500 to 700 mV at a temperature of greater than 60° C.; and
where part of the exiting leaching solution that leaves the vat reactor goes through an iron oxidation stage, external to the vat reactor, with the iron oxidation producing soluble ferric sulfate that is mixed with a recirculated portion of the output leaching solution to increase its ORP up to a value close to the upper limit of the redox potential range that is suitable for the ore leaching,
wherein iron oxidation reaction is supplemented with sulfur or pyrite to provide additional acid in order to generate heat, the additional sulfur or pyrite being controlled to achieve a desired iron and heat balance.

* * * * *